Dec. 25, 1923.
W. TURNWALD
1,478,843
VALVE CONTROLLING MECHANISM
Filed May 12, 1917   4 Sheets-Sheet 1
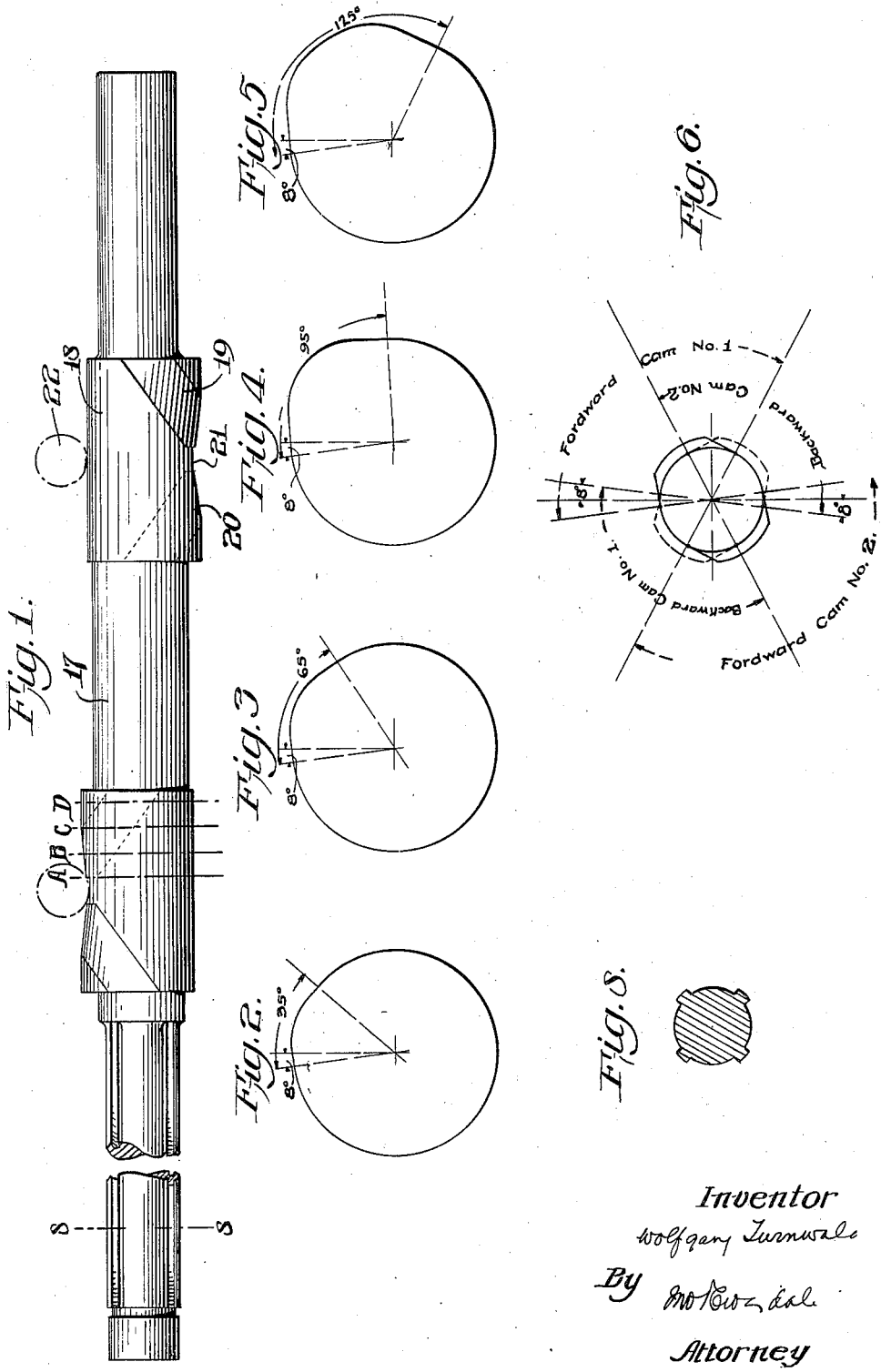
Inventor
Wolfgang Turnwald
By
Attorney

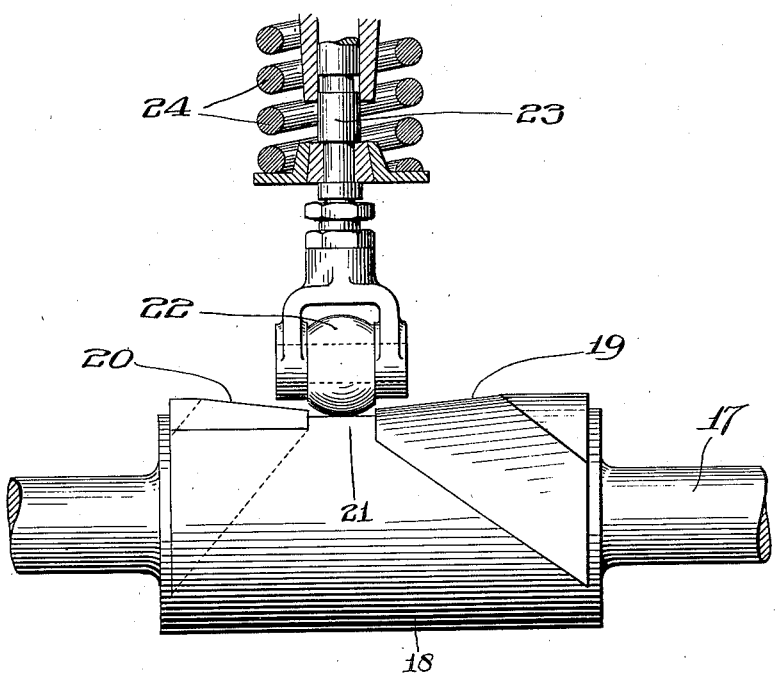
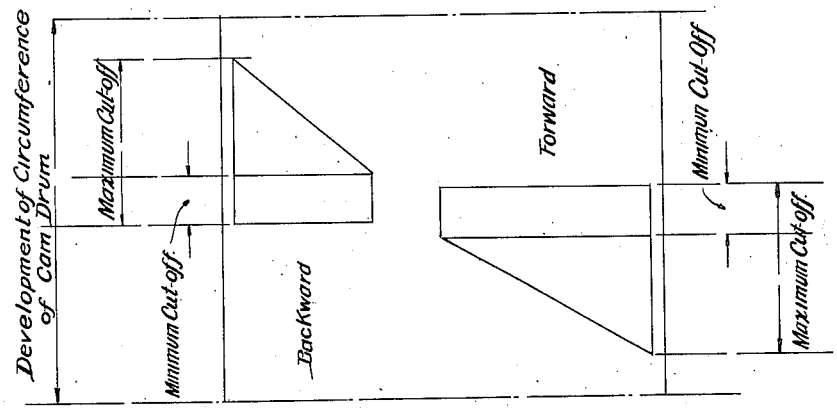

Dec. 25, 1923.

W. TURNWALD

VALVE CONTROLLING MECHANISM

Filed May 12, 1917    4 Sheets-Sheet 3

1,478,843

Inventor
Wolfgang Turnwald
By
Attorney

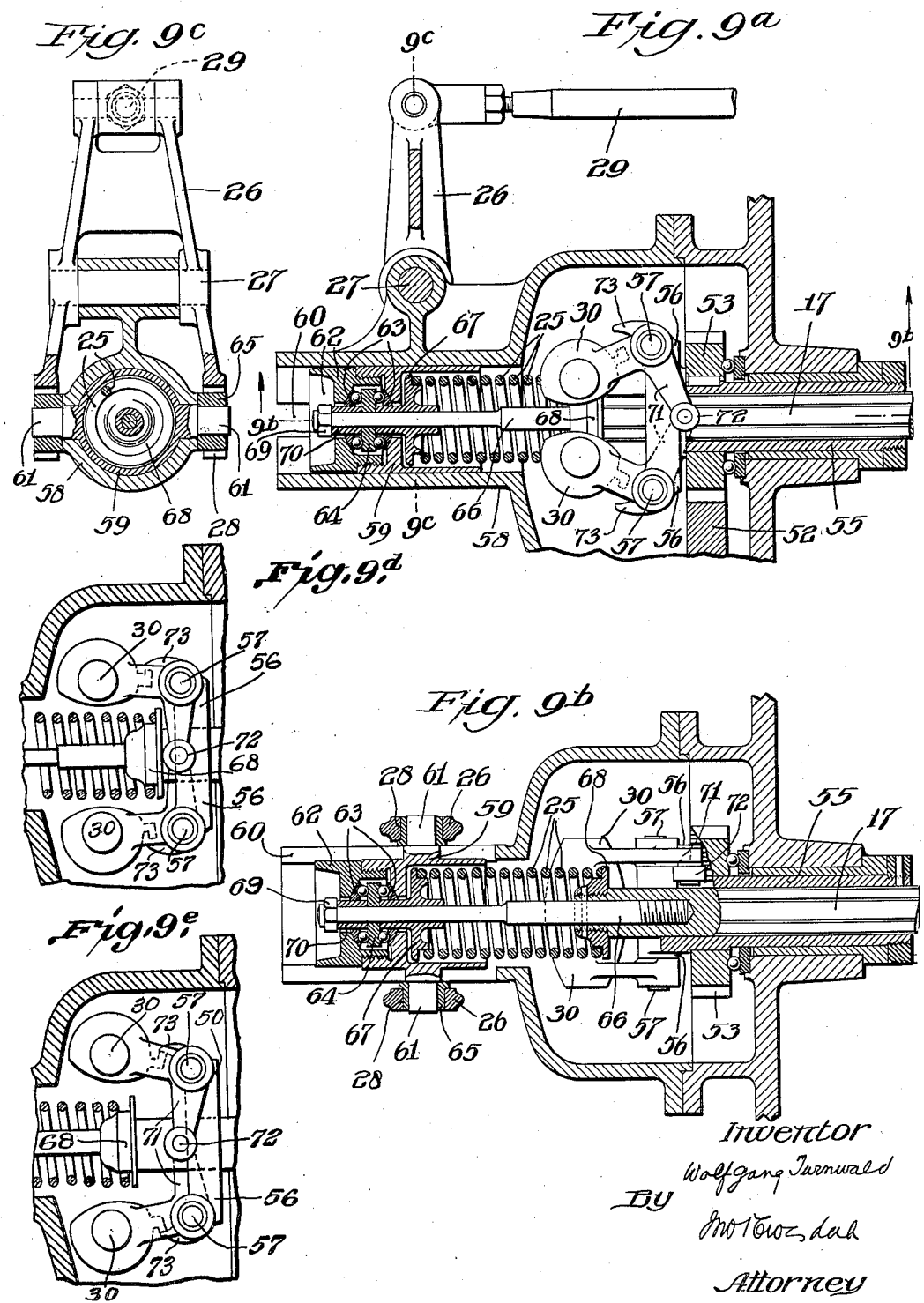

Patented Dec. 25, 1923.

1,478,843

UNITED STATES PATENT OFFICE.

WOLFGANG TURNWALD, OF SYRACUSE, NEW YORK, ASSIGNOR TO STUMPF UNA-FLOW ENGINE COMPANY, A CORPORATION OF NEW YORK.

VALVE-CONTROLLING MECHANISM.

Application filed May 12, 1917. Serial No. 168,256.

*To all whom it may concern:*

Be it known that I, WOLFGANG TURNWALD, a subject of the Emperor of Austria, residing at Syracuse, in the county of Onondaga, State of New York, have invented a new and useful Improvement in Valve-Controlling Mechanism, of which the following is a specification.

My invention relates to improvements in valve controlling mechanism, and is especially applicable to admission valves for steam cylinders of engines whose prime function is to propel land, water, or air vehicles. The object is to provide improved means for actuating the valve so that the cut-off may be varied or the engine reversed. My invention is adapted for either single acting or double acting cylinders and said controlling mechanism is adapted for both arbitrary and automatic operation. My invention includes double tapered cams, or pairs of rotating cams, which are tapered or inclined toward each other axially and which are adapted to be shifted on their axes to give a greater or less cut-off as desired, and also to reverse. By connecting the shifting mechanism to a suitable governor, this actuation becomes automatic.

My invention also comprises improvements in details of construction.

Referring to the drawings, which illustrate merely by way of example suitable means for effecting my invention:—

Fig. 1 is an elevation of a cam shaft and cams.

Fig. 2 is a section on line A of Fig. 1.
Fig. 3 is a section on line B of Fig. 1.
Fig. 4 is a section on line C of Fig. 1.
Fig. 5 is a section on line D of Fig. 1.
Fig. 6 is a diagram showing the relative position of the cams.

Fig. 7 is a diagram development of the circumference of the cam drum.

Fig. 8 is a section on line 8, 8 of Fig. 1.

Figure 9:
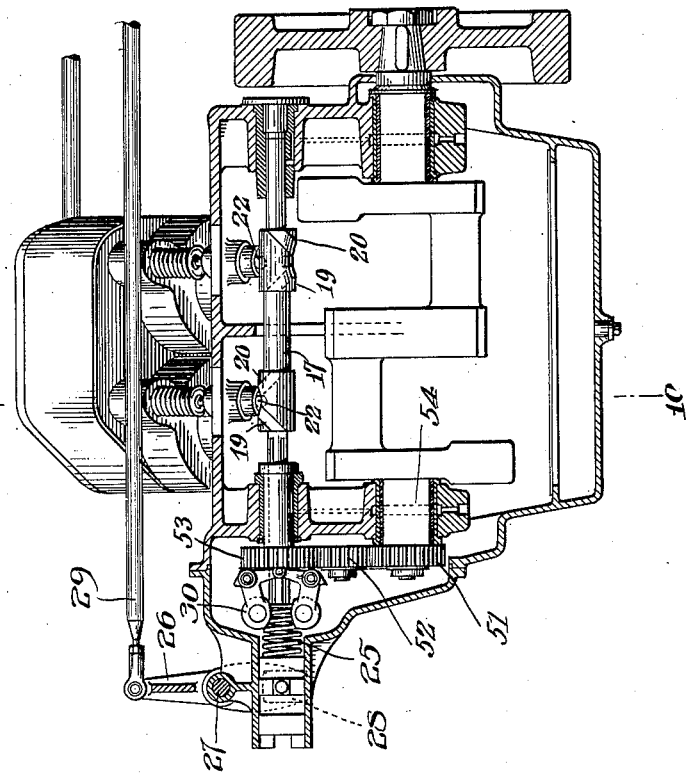
Fig. 9 is an elevation, on a reduced scale, of a V type single action four-cylinder una-flow steam engine employing the cams shown in the preceding figures.

Fig. 9ª is a vertical longitudinal section, on an enlarged scale, of the governor and associated mechanism shown in Fig. 9.

Fig. 9ᵇ is a horizontal section on the line 9ᵇ, 9ᵇ, of Fig. 9ª.

Fig. 9ᶜ is a vertical cross-section on the line 9ᶜ, 9ᶜ, of Fig. 9ª.

Figs. 9ᵈ and 9ᵉ are similar fragmentary sections showing the parts in different positions.

Figure 10:
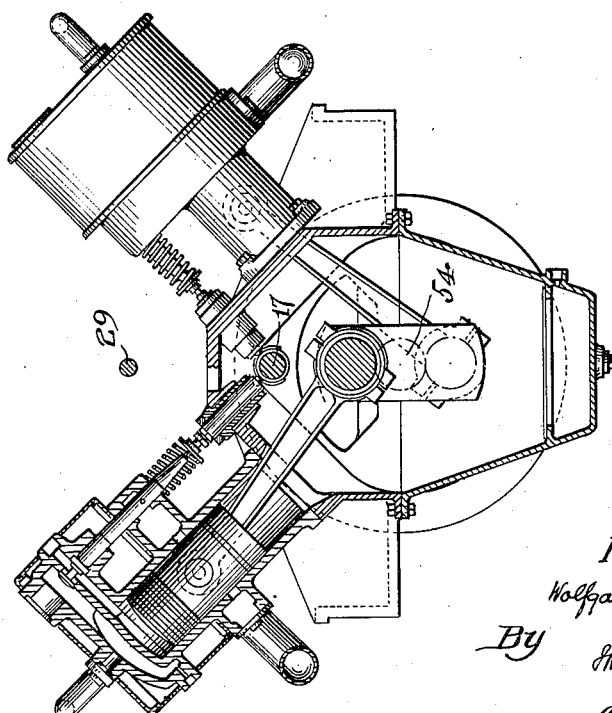

Fig. 10 is a section on line 10—10 of Fig. 9.

Similar numerals refer to similar parts throughout the several views.

Referring especially to Figs. 1, 7 and 9, the cam shaft 17 is adapted to rotate with the crank shaft or other moving part of the engine, as for example by means of the train of spur gears between the crank shaft and cam shaft as clearly shown in Fig. 9. On this cam shaft are provided the cam formations 19 and 20. These formations are tapered or inclined towards each other with a space 21 intervening which is neutral. Each cam formation is adapted to co-operate with the ball shaped roller 22 on the end of valve spindle 23, said cooperative relationship being maintained by a spring 24.

The cam shaft 17 is adapted to move axially to the right or left. The movement to the left from the neutral point, as for example in Fig. 1, brings the cam formation 19 into cooperation with roller 22 for actuating the valve, with such degree of cut-off, as required. As the movement continues to the left the cut-off increases, and as it moves toward the right, the cut-off is reduced; the maximum being at the extreme right of the cam formation, and the minimum at the extreme left, as indicated in said diagram development Fig. 7. The various dimensions of the cam formations are shown in the sections of Figs. 2 to 5 inclusive.

When the cam shaft is moved to the right from the neutral point, the roller 22 is brought into cooperation with the reverse cam formation 20, to cause a reverse, or backward movement of the engine, with the varying cut-off as above described.

It will be understood that the pulley or gear, which rotates the cam shaft, is feathered or splined thereon so that the shaft is capable of longitudinal or axial movement with respect thereto. This formation of the shaft is shown in section Fig. 8. The means for causing this longitudinal or axial movement of the cam shaft are shown, for example, in Figs. 9 to 9ᵉ. In these figures, the elements are shown as reversed with respect to the showing of the preceding views; that is, the governor is effective to move the cam shaft 17 to the left, so that the forward cam formation 19 is on the left hand, and the reverse, or backward cam formation 20 is on the right hand of the neutral point; in other respects the principle of operation is the same. The shaft is held normally in the arbitrarily adjusted position by the cooperation of lever or member 26 and spring 25. The arbitrary actuation is caused by the following means; the lever member 26 is pivoted at 27 and has a sliding box connection with the shaft as at 28 (see Fig. 9) through spring 25, and is connected at the other end to the actuating rod 29 leading to any suitable point for operation by hand. This rod 29 is also provided with any suitable latching or holding device, not shown.

The automatic actuation is caused by the governor mechanism 30, which is actuated in the usual way by centrifugal force as the speed of the engine increases, to move the cam shaft, against the force exerted by spring 25, and reduce the cut-off.

The construction and operation of the specific mechanism, illustrated in Figs. 9 to 9e inclusive, are as follows:

The cam shaft 17 is driven by a train of spur gears 51, 52 and 53, from the crank shaft 54, as shown in Fig. 9. The middle or idler gear 52 is provided to give the cam shaft 17 the same direction of rotation as that of the crank shaft 54. The gear 53 is keyed to a sleeve 55. The cam shaft 17 is feathered in sleeve 55 so as to have lateral motion therein but rotatably fixed therewith. The left hand end of sleeve 55 is provided with arms or lugs 56 which carry the pivots 57 of the governor elements 30.

The connection between the lever member 26 and the cam shaft 17 is in more detail as follows: The front part of the governor housing 58 forms a guide and support for the cross-head 59. This housing is slotted, as at 60, to provide ways for the pins or trunnions 61 of the shifting cross-head 59. The cap 62, threaded on to the outer end of the cross-head, is suitably recessed to form with the cross-head a housing for the double thrust ball-bearing, which comprises the elements 63 and the center race 64. The lever member 26 cooperates with the pins or trunnions 61 of the cross-head by means of the sliding blocks 65 in the slotted end of said lever 26 to shift the cross-head 59 in either direction. The cam shaft 17 carries an extension 66 which has a free fit in the spring support 67 and center race 64. The governor spring 25 rests against this spring support 67. The other end of the governor spring rests against the nut 68, screwed to the cam shaft 17 and has a tendency to move the shaft 17 to the right until the adjusting nut 69 and spacing collar 70 rest against the center race 64 which in turn rests against the spring supporting member 67. The initial or adjusted tension of spring 25 being in excess of any resistance offered by the cam shaft 17, the whole mechanism will follow the motion of the hand operated lever member 26, without affecting the said initial tension of spring 25, as long as the centrifugal force of the fly-balls 30 is insufficient to overcome the said initial spring tension. This initial spring tension is adjusted by nut 69.

As above stated the fly-ball elements 30 are pivoted at 57. Each fly-ball element has one inner arm 71 carrying a roller 72 which is adapted, upon sufficient outward movement of the fly-ball, to engage the flat part of nut 68 as in Fig. 9$^d$. The travel of the fly-balls is limited by the stops 73 on the arms or lugs 56.

The drawings show the cam shaft in neutral position. With the engine running, the fly-balls will assume the position with rollers 72 on arms 71, bearing against the flat side of nut 68, as in Fig. 9$^d$, or with the cam shaft on reverse, if the speed is sufficient, the fly-ball elements will engage the stops 73, as in Fig. 9$^e$.

The governor in the present example is operative only for one sense of rotation, which usually will be the forward running of the engine. To have the engine controlled by the governor, the driver has to throw the hand operated lever member 26 to the desired initial cut-off and latch it. This will move the cam shaft 17 to the right, and bring cam formation 19 into cooperation with the valve spindle roller 22. As soon as the engine reaches the speed for which the governor spring is set, the governor flyballs will take hold and move the cam shaft against the initial spring tension, to the left to the cut-off required by the load.

The purpose of the construction is to move the cam shaft arbitrarily by means of the hand operated lever to any initial position required, and the actuating rod 29 is locked in such position, so that whenever the engine reaches the speed for which the governor is set, the governor will take hold and prevent the engine from racing.

What I claim is:

1. Valve controlling mechanism for steam engines, comprising a governor, a rotatable and longitudinally movable cam shaft provided with valve actuating tapered cam formations, means for rotating the cam shaft relatively to engine speed, means operated arbitrarily and independently of the governor, for moving the cam shaft longitudinally, comprising an actuating member and a spring cooperating therewith under its initial tension, the governor adapted to shift the cam shaft against said initial tension upon predetermined engine speed.

2. Valve controlling mechanism for steam engines, comprising a governor, a rotatable and longitudinally movable cam shaft provided with valve actuating tapered cam formations, means for rotating the cam shaft relatively to engine speed, means operated arbitrarily and independently of the governor, for moving the cam shaft longitudinally, comprising an actuating member and a spring cooperating therewith under its initial tension, the governor adapted to shift the cam shaft against said initial tension, and means for adjusting said initial tension.

3. Valve controlling mechanism for steam engines, comprising a governor, a rotatable and longitudinally movable cam shaft provided with valve actuating tapered cam formations, means for rotating the cam shaft relatively to engine speed, means operated arbitrarily and independently of the governor, for moving the cam shaft longitudinally, comprising an actuating-lever, a cooperating cross-head and a spring for communicating the movement of the cross-head to the cam shaft, the governor adapted to shift the cam shaft against the tension of the spring.

4. Valve controlling mechanism for steam engines, comprising a rotatable and longitudinally movable cam shaft provided with valve actuating tapered cam formations for both forward and reverse drive, means for rotating the cam shaft relatively to engine speed, means for arbitrarily moving the cam shaft longitudinally comprising a cross-head, an actuating-lever therefor, a spring support operated thereby and a spring for communicating the movement thereof directly to the cam shaft, and a governor for automatically shifting the cam shaft against the tension of the spring.

5. Valve controlling mechanism for steam engines, comprising a rotatable and longitudinally movable cam shaft provided with valve actuating tapered cam formations for both forward and reverse drive, means for rotating the cam shaft relatively to engine speed, means for arbitrarily moving the cam shaft longitudinally to cause said forward or reverse drive, comprising an actuating-lever, means forming a movable housing for a double ball bearing thrust, having a center race, a spring support connected to the center race and a spring for communicating the movement thereof to the cam shaft, and a governor for automatically shifting the cam shaft against the tension of the spring.

6. Valve controlling mechanism for steam engines, comprising a rotatable and longitudinally movable cam shaft provided with valve actuating tapered cam formations, means for rotating the cam shaft relatively to engine speed, means for arbitrarily moving the cam shaft longitudinally, to vary the cut-off, comprising an actuating-lever and a spring for communicating the movement of the lever to the cam shaft, and a governor, initially free from the spring control, for automatically shifting the cam shaft against the tension of the spring.

7. Valve controlling mechanism for steam engines, comprising a rotatable and longitudinally movable cam shaft provided with valve actuating tapered cam formations, means for rotating the cam shaft relatively to engine speed, means for arbitrarily moving the cam shaft longitudinally, to secure the required initial cut-off, comprising an actuating-lever and a spring for communicating the movement of the lever to the cam shaft, and a governor, initially free from the action of the spring, for automatically shifting the cam shaft against the tension of said spring.

8. Valve controlling mechanism for steam engines, comprising a rotatable and longitudinally movable cam shaft provided with valve actuating tapered cam formations, means for rotating the cam shaft relatively to engine speed, means for arbitrarily moving the cam shaft longitudinally, comprising an actuating-lever and a spring for communicating the movement of the lever to the cam shaft, and a governor, initially free from the action of the spring, for automatically shifting the cam shaft against the tension of said spring to reduce the cut-off.

9. Valve controlling mechanism for steam engines, comprising a rotatable and longitudinally movable cam shaft provided with valve actuating tapered cam formations, means for rotating the cam shaft relatively to engine speed, means for arbitrarily moving the cam shaft longitudinally, comprising an actuating-lever and a spring for communicating the movement of the lever to the cam shaft, a governor for automatically shifting the cam shaft against the tension of the spring, and means for adjusting the tension of the spring.

WOLFGANG TURNWALD.

Witnesses:
C. C. Trump,
W. A. Reville.